Figure 1:
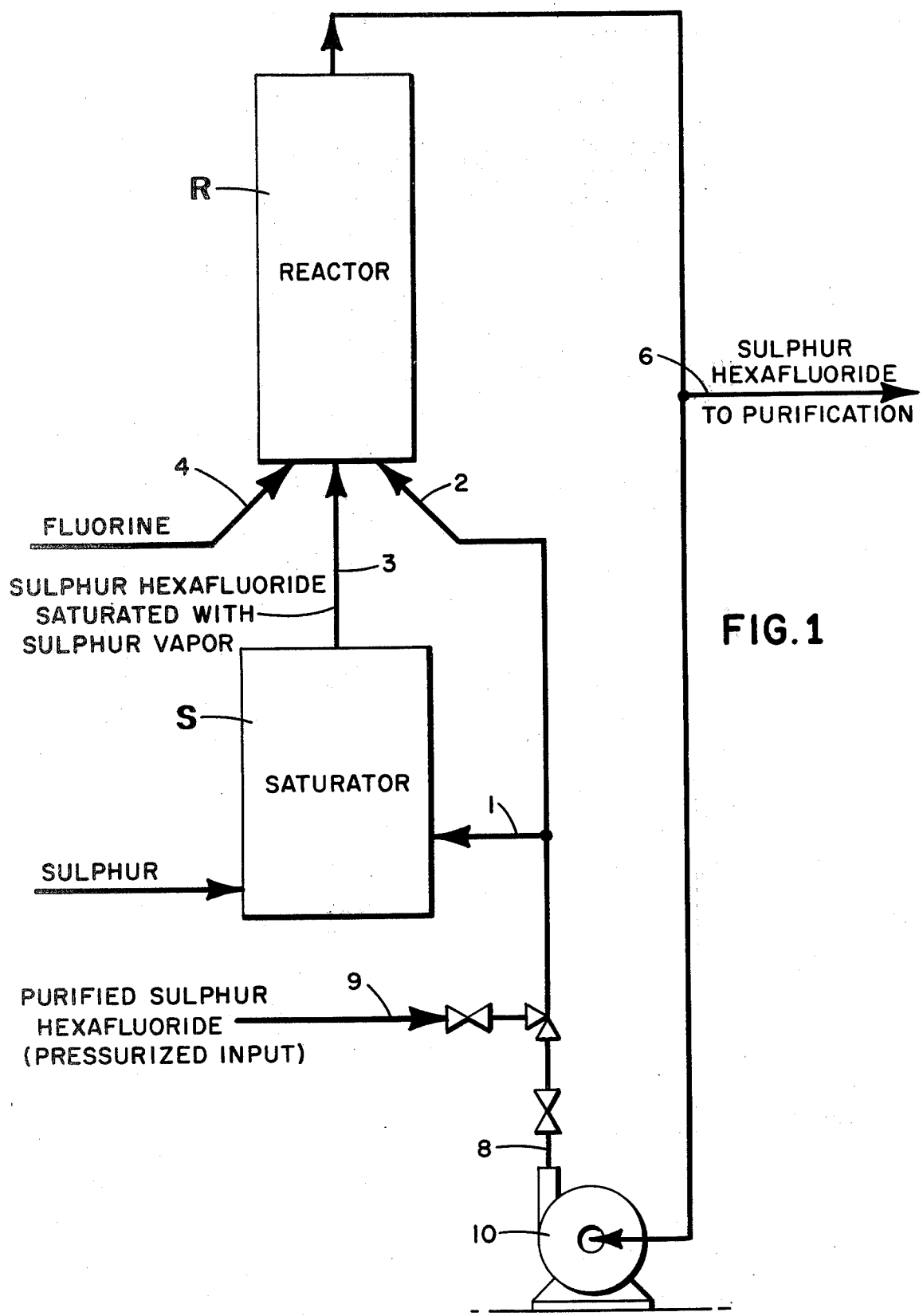

United States Patent [19]

Di Gioacchino et al.

[11] 4,186,180

[45] Jan. 29, 1980

[54] METHOD FOR THE PREPARATION OF SULPHUR HEXAFLUORIDE OF HIGH PURITY

[75] Inventors: Alberto Di Gioacchino; Giulio Tommasi; Mario de Manuele, all of Milan, Italy

[73] Assignee: Montedison S.p.A., Milan, Italy

[21] Appl. No.: 897,741

[22] Filed: Apr. 17, 1978

[30] Foreign Application Priority Data

Apr. 19, 1977 [IT] Italy .................. 22611 A/77

[51] Int. Cl.² ......................................... C01B 17/45
[52] U.S. Cl. .................................. 423/469; 423/489; 422/129; 422/224
[58] Field of Search .................. 423/469, 489

[56] References Cited

U.S. PATENT DOCUMENTS

| | | |
|---|---|---|
| 2,555,739 | 6/1951 | Gall .......................... 423/469 |
| 3,336,111 | 8/1967 | Watson et al. ............. 423/469 |
| 4,039,646 | 8/1977 | Massonne et al. ......... 423/469 |

FOREIGN PATENT DOCUMENTS

| | | | |
|---|---|---|---|
| 1445502 | 3/1965 | France ......................... 423/469 |
| 1039201 | 8/1966 | United Kingdom ......... 423/469 |
| 1175774 | 12/1969 | United Kingdom ....... 423/469 |

Primary Examiner—Herbert T. Carter
Attorney, Agent, or Firm—Stevens, Davis, Miller & Mosher

[57] ABSTRACT

Process and apparatus are disclosed for the preparation of sulphur hexafluoride of high purity, starting from elemental fluorine and sulphur, both in gaseous phase, and operating with an excess of fluorine, characterized in that the fluorine is fed into a reaction chamber through inlets in a metal plate, maintained at between 30° and 70° C., while the sulphur is fed in through the nozzle of a burner, by regulating a current of an inert gas which is saturated with sulphur by passing same through a zone containing molten sulphur at a temperature between 250° and 500° C., and subsequently superheating the inert gas thus saturated with sulphur to a temperature between 300° and 550° C., and introducing a separate current of the same inert gas between the plate and the burner so as to ensure that the flame that develops when the sulphur and the fluorine come into reactive contact with each other shall be kept insulated from the nozzle, and recovering and purifying the resulting sulphur hexafluoride.

5 Claims, 2 Drawing Figures

METHOD FOR THE PREPARATION OF SULPHUR HEXAFLUORIDE OF HIGH PURITY

The present invention relates to a new method for the preparation of sulphur hexafluoride of high purity starting from the elements thereof, and to apparatus for carrying out such method.

Sulphur hexafluoride is a chemically inert gas which, thanks to its appreciable insulating properties, is used in highvoltage line switches, in transformers, and in radar and electronic equipment.

In order that the sulphur hexafluoride may be applied to these fields of use, however, it is necessary that it be of high purity.

The usual methods for the preparation of sulphur hexafluoride are based on direct reaction between fluorine and sulphur or between fluorine and sulphur compounds such as for instance $H_2S$ and $CS_2$. These latter evidently are not competitive due to the exceedingly high consumption of costly electrolytic fluorine.

Processes based on direct synthesis from the elements differ in the type of feeding of the sulphur to the reaction; this is to say, in whether the sulphur is fed in the liquid or the gaseous phase.

The use of sulphur in the liquid state in general leads to the formation of incompletely fluorinated compounds, such as for instance $S_2F_2$, $SF_4$, $S_2F_{10}$, in rather considerable quantities with the consequential lowering of the yield in respect of the desired sulphur hexafluoride.

The use of liquid sulphur brings with it, moreover, still another drawback: the sulphur hexafluoride thus obtained contains sulphur vapors which, sublimating, cause clogging problems in the piping down-stream of the reactor.

By the use of sulphur in the vapor state, one obtains the advantage of reducing the fraction of incompletely fluorinated compounds by conducting the reaction with a slight excess of fluorine. In this case too, however, one meets with the difficulty of handling or regulating the sulphur vapor; a difficulty which leads to serious shortcomings of a technical nature such as clogging in the coldest points of the system due to the effect of sublimation.

Thus, one object of this invention is that of providing a method for the preparation of sulphur hexafluoride starting from fluorine and sulphur in gaseous phase, thereby overcoming the drawbacks involved in the regulation of the sulphur vapor.

Still another object of this invention is that of providing a method easily practiced on an industrial scale.

These and still other objects are obtained by means of the method of this invention, and which consists or consists essentially in feeding the elemental fluorine into the reaction chamber through holes made in a metal plate maintained at a temperature between 30° and 70° C. while the sulphur is fed through the nozzle of a burner, by regulating a flow of inert gas which is saturated by passing it through an apparatus containing molten sulphur at between 250° and 500° C. and by subsequently overheating or superheating the flow of sulphur-saturated inert gas to a temperature between 300° and 550° C., while a current of the same inert gas is fed between the plate and the burner so that the flame, which develops when the sulphur comes into contact with the fluorine, is kept detached or separated from the nozzle.

The sulphur hexafluoride formed by reaction in this manner is then subjected to conventional purification processes per se well known in the prior art.

As the inert gas there may be used a portion of the sulphur hexafluoride which is produced, this being partially recycled as such or after purification.

Figure 2:
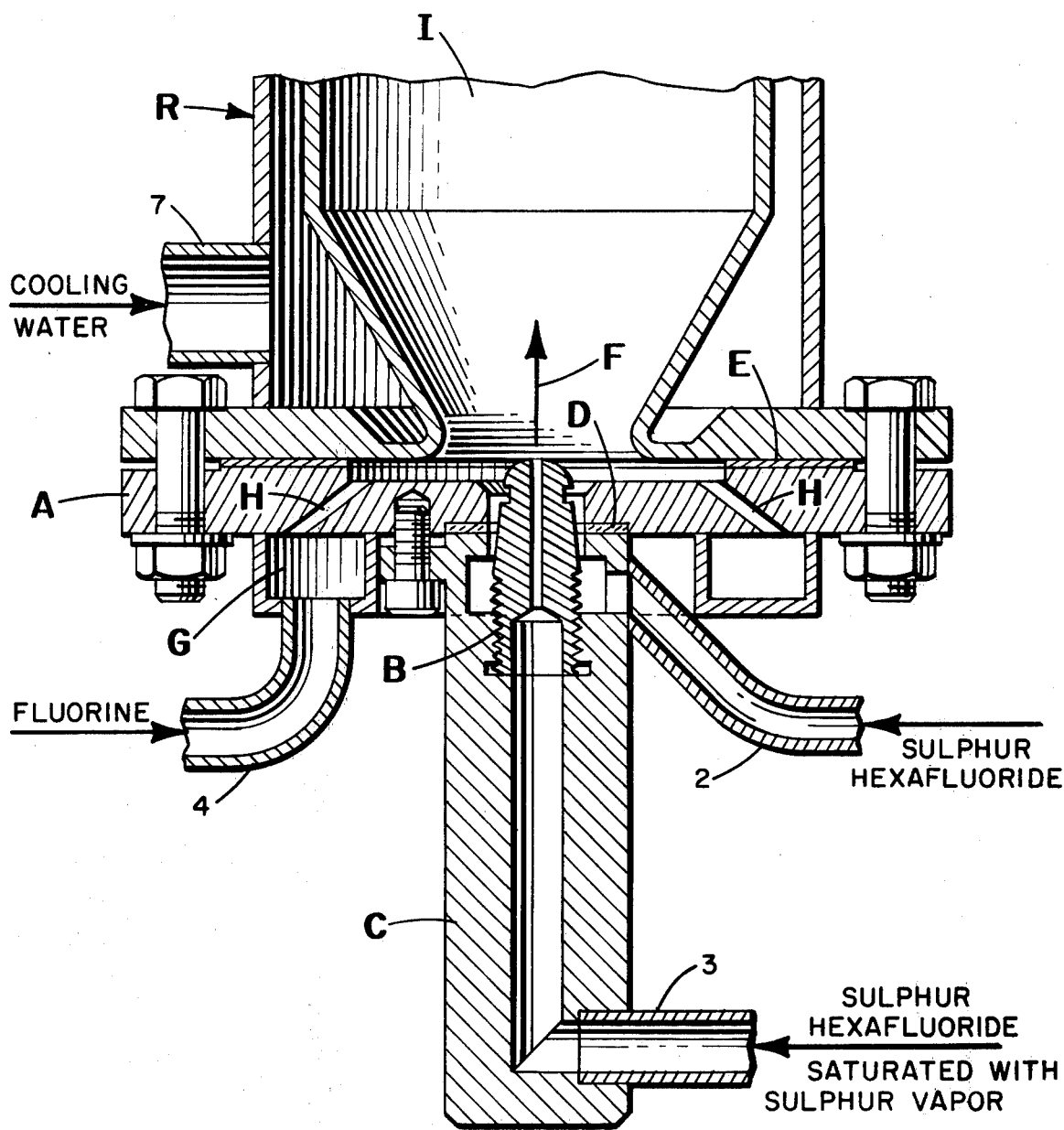

In order still better to understand the inventive idea of this invention reference is made to the accompanying drawings wherein FIG. 1 is a flowsheet of the overall process, while FIG. 2 is a sectional view showing the novel reactor arrangement.

As shown in FIG. 1, a current of elemental fluorine is introduced through conduit 4 into the bottom of reactor R, while from the top of this reactor the sulphur hexafluoride product flows out and is then conveyed to the conventional purification processes. The sulphur hexafluoride may be sent to purification through conduit 6 only in part, while the other part of it is re-cycled through conduit 8, and subdivided into two flows: first flow through conduit 1, which enters apparatus S in which it will be saturated with sulphur vapors, and second flow through conduit 2, into the bottom of the reactor R. To saturator S the sulphur is fed in through conduit 5, while the sulphur hexafluoride saturated with sulphur vapors is fed into the reactor through conduit 3.

Instead of directly recycling a portion of the sulphur hexafluoride product, one may instead (or in addition) employ purified sulphur hexafluoride, which is fed into the system under pressure through conduit 9.

The necessary flow of gases in the system is effected in any well known manner such as by a pump shown schematically at 10.

FIG. 2 represents a detail of the apparatus used for the practical realization of the method of this invention.

Through pipe 4 the elemental fluorine enters an annular chamber G from where, via a number of holes H drilled into metal plate A, it flows into the frusto-conical reaction chamber I.

The metal plate A is made of a material having good thermal conductivity and resistance to chemical attack. For instance, brass has proved to be particularly suited for the purpose.

The holes H of the plate A are arranged on the circumference of a circle concentric with respect to the point of introduction of the sulphur F and are close to each other in order to achieve a distribution that is the closest possible to a continuous line or sheet of incoming fluorine. Moreover, they are arranged in such a way that their axes shall form with the horizontal surface of the plate A an angle between 20° and 45°, in order to avoid the deposit of solid substances dragged along by the fluorine on the cold wall of the reaction chamber.

Metal plate A is kept cold at a temperature between 30° and 70° C., by conduction through a metal gasket E, for instance soft copper, placed between the plate and the bottom of the reaction chamber.

The recycling sulphur hexafluoride, which, as previously indicated, may be either a portion of that directly flowing out of the reactor or that obtained after purification or a mixture of the two, is subdivided into two streams in conduits 2 and 3.

Since one always operates with a slight excess of fluorine in order to avoid the formation of underfluorinated compounds, for the regulation of flow in conduits 3 there must be taken into account the fluorine in excess in the final sulphur hexafluoride product. Said fluorine-plus-sulphur hexafluoride current, after saturation with sulphur vapors at a temperature of between 250° and 500° C., but preferably between 360° and 400° C., and overheated or superheated to between 300° and 550° C., but preferably to 400° to 440° C., is fed into the reactor through a block C made of a corrosion-resistant material having good thermal conductivity such as for instance Inconel 600, Hastelloy C, Hastelloy B, and which is kept at a temperature greater than that of saturation of the $SF_6$ with sulphur vapors, i.e., at 300° to 550° C., by means of e.g. conventional electrical resistance heaters (not shown).

From block C, positioned at the center of the plate A, current 3 reaches the reaction chamber I through nozzle B made of the same material as block C, threaded to the block itself and maintained at the same temperature at which the block C is maintained in order to hinder the deposition of sulphur on the cold walls.

For greater resistance to the corrosion from fluorine, the outside surface of the nozzle may be either nickel, monel or palladium-plated, or coated with a layer of an inorganic fluoride such as for instance calcium fluoride.

Current 2, which is fed between the nozzle B and the plate A, must have the same temperature as that of current 3 in order not to cool down nozzle B, and serves the purpose of keeping the flame away from contact with the nozzle B itself in order to avoid damaging the nozzle by the heat of the flame.

The assembly of block C and nozzle B, as has been previously indicated, is maintained at a temperature greater than the saturation temperature of the sulphur hexafluoride saturated with sulphur, and is connected to plate A.

Between block-nozzle assembly C-B and the plate A there is disposed an insulating gasket D, for instance of asbestos. The block-nozzle assembly may also be made as one single block.

The reaction chamber is cooled by a water jacket whose circulating water (introduced via line 7) removes the reaction heat, and may be made of carbon steel, Inconel 600, nickel or other corrosion-resistant materials.

From the lower zone of the reaction chamber the gases, after having reacted, flow into the upper zone where, passing through e.g. a water-cooled tube nest (not shown) they are further cooled down.

At the outlet of the reactor the gases are analyzed because, as previously indicated, the regulation of the recycle flow rate is determined on the basis of the fluorine content of the raw product gases.

The quantity of the recycle (sum of current 2 plus current 1) in general may vary from 0.1 to 4 times the quantity produced (current 6), and it will depend on the saturation temperature of the sulphur. The distribution of the recycle on the two currents 2 and 1 is likewise quite variable depending on the operational conditions, but in general is maintained around a ratio of 1:1. These ratios are by weight.

The sulphur hexafluoride that is not recycled, before being utilized industrially, is purified by using conventional methods of the prior art. For example, the effluent gases may be subjected to a first washing in water, and then to a washing with an aqueous potash or caustic soda solution in order to eliminate the water-soluble impurities and/or the impurities hydrolyzable in alkali, such as for instance HF, $F_2$, $SF_4$, $S_2F_2$, $SO_2F_2$. The gases may then be passed successively through active carbon in order to eliminate possible high-boiling substances such as $S_2F_{10}$, $SF_5$—O—$SF_5$, then dried on soda flakes and on molecular sieves for the elimination of moisture, after which they are then compressed, rectified for the removal of oxygen, nitrogen and $CF_4$, and finally conveyed to storage.

The following examps are given purely for illustrative and not limiting purposes:

EXAMPLE 1

Reference is made to the flowsheet of FIG. 1 and to the apparatus of FIG. 2.

From an electrolytic cell into an annular chamber G, welded to plate A and made of brass, were fed 2.8 kg/hr. of $F_2$. The plate A was maintained at a temperature of around 40° C. by reason of the conductivity of copper gasket E.

The fluorine is fed into the annular chamber G and from there it is distributed through 16 holes of 4 mm diameter, spaced from each other about 21 mm, and whose axes form with the horizontal surface of the plate an angle of 30°.

From the reactor I, 4.5 kg/hr. of recycled sulphur hexafluoride are split into two about equal currents of which one (via line 2) is used for isolating the flame of the burner while the other (first via line 1 then via line 3) serves as a transportation or carrier gas for the sulphur.

This latter portion (from line 1) is made to bubble through molten sulphur in a relatively small tank, kept at about 400° C. by means of electrical resistances. Thereafter it is fed to the reactor I via line 3 through block C, the latter being kept at about 420° C. by electrical heaters, and through nozzle B which is kept at a temperature greater than 400° C. by conductivity from the block C. The block C, the nozzle B, and the associated piping to be maintained under heat are made of Inconel 600.

The gases flowing out of the reactor I showed the following composition:

| | |
|---|---|
| HF | 5.55% by weight |
| $SF_6$ | 93.95% by weight |
| $F_2$ | 0.50% by weight |

After purification according to conventional prior art methods, that is by washing with water and an alkaline bath, then passing over active carbon and molecular sieves, rectification for separation of oxygen, nitrogen and $CF_4$, the purified gases having the following composition:

| | | |
|---|---|---|
| $SF_6$ | 99.9940% | by weight |
| air | 0.0013% | by weight |
| $CF_4$ | 0.0047% | by weight |
| moisture | 0.61 | ppm |
| acidity (as HF) | 0.03 | ppm |
| hydrolyzable F | 0.011 | ppm |
| toxicity | | none | were sent to storage.

The output rate was about 3.5 kg/hr of purified gas, while the yield of the reaction was 99.36% based on the fed fluorine.

EXAMPLE 2

Using the same equipment as described in the preceding example, into the annular chamber G were introduced 2.8 kg/hr of electrolytic fluorine. The temperature of the plate was maintained at about 40° C. as in the preceding example.

As the carrier gas this time, relatively pure sulphur hexafluoride that had has been subjected to various conventional purification processes (current 9 of FIG. 1) was employed.

The flow rate of $SF_6$ used for the transport of the sulphur was 1.1 kg/hr while the temperature of the sulphur bath was maintained at about 375° C.

The temperature of block C and of nozzle B was maintained at a level above 375° C., and more particularly around 400° C.

The flow rate of the sulphur hexafluoride fed in (via line 2) for separating the flame from the burner amounted to about 0.5 kg/hr.

The gases flowing out of the reactor had on the average the following composition:

| | | |
|---|---|---|
| HF | 5.56% | by weight |
| $SF_6$ | 93.44% | by weight |
| $F_2$ | 1.00% | by weight |

After purification, the product gases showed the following composition:

| | | |
|---|---|---|
| $SF_6$ | 99.9937% | by weight |
| air | 0.0045% | by weight |
| $CF_4$ | 0.0012% | by weight |
| moisture | <1 | ppm |
| acidity (as HF) | 0.023 | ppm |
| toxicity | none | |

In this example the output rate of purified gas was around 3.5 kg/hr., while the reaction yield was 98.65% based on the fed fluorine.

What is claimed is:

1. A process for the preparation of sulphur hexafluoride of high purity, from elemental fluorine in gaseous phase and elemental sulphur in vapor phase, and operating with an excess of fluorine, characterized by feeding the fluorine into a reaction chamber through inlets in a metal plate, maintained at between 30° and 70° C., while feeding the sulphur through the nozzle of a burner, regulating a current of an inert gas comprising sulphur hexafluoride which is saturated with sulphur by passing same through a zone containing molten sulphur at a temperature between 250° and 500° C., and subsequently superheating the said inert gas thus saturated with sulphur vapor to a temperature between 300° and 550° C., and introducing a separate current of inert gas comprising sulphur hexafluoride between the metal plate and the burner so as to ensure that the flame that develops when the elemental sulphur and the elemental fluorine come into reactive contact with each other to form sulphur hexafluoride shall be kept insulated from the nozzle, and recovering the resulting sulphur hexafluoride.

2. A process according to claim 1, characterized in that the inert gas comprising sulphur hexafluoride is employed either as such as it flows out of the reactor or after purification.

3. A process according to claim 1, characterized in that the inert gas comprising sulphur hexafluoride is passed through the molten sulphur kept at a temperature between 360° and 400° C.

4. A process according to claim 2, characterized in that the sulphur hexafluoride, after having been saturated with sulphur vapors, is superheated to a temperature between 400° and 440° C.

5. A process according to claim 1, wherein the sulphur hexafluoride coming from the reactor is split into three portions, one portion being withdrawn as sulphur hexafluoride product, a second portion being recycled to the zone of molten sulphur to serve as inert carrier gas for reactant sulphur vapor, and the third portion being recycled directly to the sulphur hexafluoride reactor.

* * * * *